United States Patent [19]
Jackson et al.

[11] Patent Number: 5,717,720
[45] Date of Patent: Feb. 10, 1998

[54] DIGITAL DATA RECEIVERS, METHODS AND CIRCUITRY FOR DIFFERENTIATING BETWEEN TRANSMITTED SIGNALS OF VARYING PHYSICAL PROTOCOLS AND FREQUENCIES

[75] Inventors: Lisa Piper Jackson, Macungie; William Burdett Wilson, Allentown, both of Pa.

[73] Assignee: Lucent Technologies Inc., Murray Hill, N.J.

[21] Appl. No.: 355,366

[22] Filed: Dec. 13, 1994

[51] Int. Cl.$^6$ .............................. H03K 9/00; H04L 27/06
[52] U.S. Cl. ...................... 375/316; 375/340; 375/377
[58] Field of Search .................................. 375/316, 324, 375/328, 340, 217, 349, 351, 368, 360, 364, 377; 455/222, 218, 225, 223, 224, 312; 329/313, 341

[56] References Cited

U.S. PATENT DOCUMENTS 5,199,049  3/1993  Wilson .

OTHER PUBLICATIONS

"23. Physical Coding Sublayer (PCS), Physical Medium Attachment Sublayer (PMA) and Baseband Medium, Type 100Base-T4," Draft Supplement to IEEE Std 802.3, 100Base-T, Oct. 30, 1994, pp. 23-1-23-85.

*Primary Examiner*—Stephen Chin
*Assistant Examiner*—Hai H. Phan

[57] ABSTRACT

Disclosed are digital data receivers, methods and circuitry for differentiating between signals and data packets of varying physical layer protocols and frequencies transferred over a digital burst mode communications system, such as a packet-based LAN. Transitions in a received input signal to a squelch circuit start a counter which asserts one or more signals at various predetermined times from the transition. The absence or presence of the signal when the next transition in the input signal occurs indicates whether the input signal is less than or greater than a frequency associated with a particular predetermined time interval. When a predetermined number of transitions meeting a particular frequency requirement are received, the input signal is determined to be received at a particular frequency.

22 Claims, 4 Drawing Sheets

DIGITAL DATA RECEIVERS, METHODS AND CIRCUITRY FOR DIFFERENTIATING BETWEEN TRANSMITTED SIGNALS OF VARYING PHYSICAL PROTOCOLS AND FREQUENCIES

TECHNICAL FIELD OF THE INVENTION

The present invention relates generally to signal transference over communications systems, and more particularly to digital data receivers, methods and circuitry for differentiating between signals and data packets of varying physical layer protocols and frequencies which are transferred over digital burst mode communications systems.

BACKGROUND

Communications systems and networks typically include a number of processing system nodes. The nodes communicate with one another through the transferring or transmission of data packets.

A burst mode communications system, for example, will typically use digital data packets to communicate among the nodes of the network. The data packets are data bursts that one node sends to the other nodes of the system. Each receiving node analyzes the data packet to determine if the particular data packet is addressed to it.

Communications systems may be classified by a physical distance parameter. Physical distance distinguishes those communications systems in which the particular nodes are distributed, or distantly located, with respect to one another, from those systems in which the nodes are located relatively close together, such as within the same building, for example.

The latter type of communications system is commonly known as a local area network ("LAN"). It should be noted that any one particular node may itself be a separate and distinct communications system. The data packet transfer rate between the nodes of a LAN are typically relatively high as compared with the transfer rates between the nodes of the former distributed system.

The "star" and the "token ring" are two popular LAN topologies. Others included various combinations of the two. In a LAN there are typically several levels or hierarchies: a high-speed "back-bone" and a slower speed local network coupling to the backbone through "repeaters" and multiplexers. Such a configuration is more fully discussed in U.S. Pat. No. 5,199,049, entitled "Circuit and Method of Digital Carrier Detection for Burst Mode Communication", which is commonly owned by the assignee of the present invention and which is incorporated herein by reference. The various nodes typically communicate with one another through the backbone or within a repeater.

The repeaters within the star LAN configuration, for example, typically communicate with other nodes through a slow speed medium, such as, for example, a twisted wire pair for each direction of communication, and a corresponding transmit/receive interface. The interface and the repeaters typically include a receiver. The receiver is operable to receive modulated signals and data packets, and to convert same into useful data information or intelligence.

Conventional communication systems, and receivers in particular, however, are faced with a developing problem which centers upon their respective inabilities to differentiate between data packets transmitted with different physical layer protocols running over the same media and, more generally, between actual data packets transferred over the media and other intelligent signals, such as, jam signals, for example, transmitted over same. Different physical layer protocols more particularly are specifications for the format and relative timing of information exchanged between communicating systems and nodes.

SUMMARY OF THE INVENTION

Disclosed are digital data receivers, methods and circuitry for differentiating between signals and data packets of varying physical layer protocols and frequencies transferred over a digital burst mode communications system, such as a packet-based LAN. In particular, a digital data receiver for differentiating between input signals transmitted at one of a plurality of frequencies in accordance with the principles of the present invention includes, receiving, generating and determining means. The receiving means operates to receive an input signal. The generating means operates to generate a plurality of timing signals wherein each one of the timing signals is generated at a particular predetermined time after a first polarity transition in the input signal. The determining means operates to determine if a second polarity transition in the input signal occurs during a particular time interval between ones of the timing signals.

A method in accordance with the principles of the present invention concerns controlling the processing path of an input signal received at one of two frequencies. The method preferably includes the steps of generating a plurality of timing signals wherein each one of the timing signals is generated at a particular predetermined time after a first polarity transition in the input signal, and determining if a second polarity transition in the input signal occurs during a particular time interval between ones of the timing signals wherein the particular time interval corresponds to one of the two frequencies.

A circuit in accordance with the principles of the present invention concerns selectively directing or controlling the processing path of a received input signal. The input signal preferably has a transmission frequency equal to one of a plurality of frequencies. The circuit includes both generating and determining means. The generating means operates to generate a plurality of timing signals wherein each one of the timing signals is generated at a particular predetermined time after a first polarity transition in the input signal. The determining means operates to determine if a second polarity transition in the input signal occurs during a particular time interval between ones of the timing signals.

BRIEF DESCRIPTION OF THE DRAWINGS

For a more complete understanding of the present invention, and the advantages thereof, reference is made to the following descriptions taken in conjunction with the accompanying drawings in which like numbers designate like parts, and in which.

DETAILED DESCRIPTION OF THE INVENTION

Figure 1:
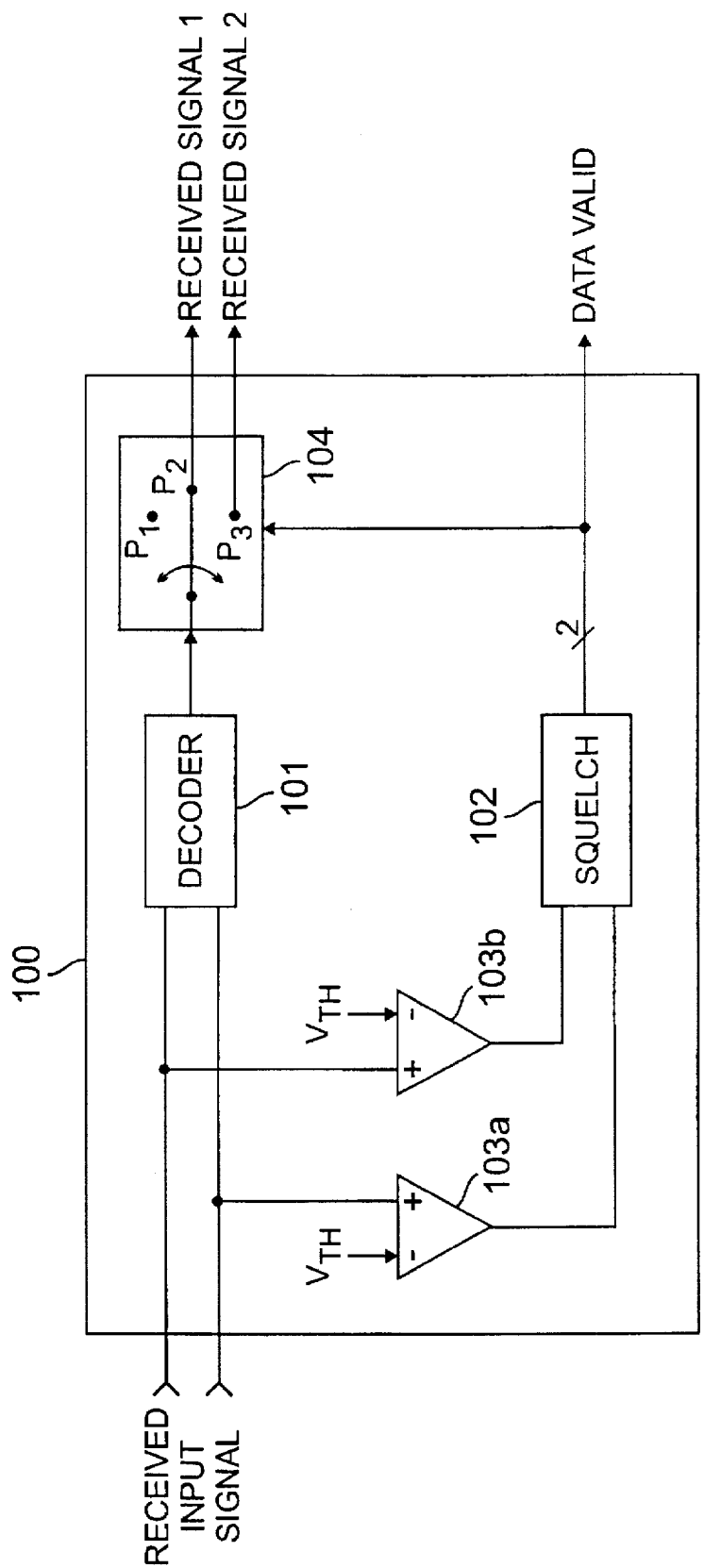
FIG. 1 illustrates an exemplary digital data receiver for data packet applications.

FIG. 1 illustrates an exemplary digital data receiver for data packet applications, such as are used in conventional processing system based communications systems. It is understood that the principles of the present invention may be applicable to virtually any digital receiver application, such as the digital receiver used by a conventional repeater to communicate on the high speed backbone or in a burst mode satellite communications system, to name two examples. The illustrated receiver 100 includes a decoder 101, a squelch circuit 102, a pair of slicers 103a and 103b, and a three position switch 104.

The decoder 101 converts the received input signals, such as a differential signal which would be received from a twisted pair, to digital data signals having a uniform amplitude. If desired, receiver 100 may also re-time the data. The decoder 101 is preferably a differential comparator without re-timing capability, such as that illustrated in U.S. Pat. No. 4,818,929, which is commonly owned by the assignee of the present invention, and which is incorporated herein by reference.

The squelch circuit 102 is driven by a pair of slicers 103a and 103b, each having a slicing voltage of Vth. The slicers 103a and 103b, or amplitude gates, operate to pass only those portions of an input signal lying outside two amplitude boundary level values, or thresholds. The slicing voltage, Vth, operates to set the minimum amplitude that the differential input signal must exceed to be considered, and to be applied to squelch circuit 102. In addition, each slicer 103a and 103b preferably converts the differential input signals to two single-ended output signals. As will be shown in more detail momentarily, if the differential input signals do not exceed the slicing limits, the outputs of the slicers 103a and 103b are "LOW". This preferably creates a "dead zone" in input signal amplitudes that slicers 103a and 103b will not respond to, thereby providing the noise immunity of receiver 100.

A further aspect of the illustrated embodiment is that although the input signals are described as differential, non-differential signals may similarly be utilized. However, as will become apparent, squelch circuit 102 relies on detecting positive-going and negative-going edges in the input signals and a means is preferably provided with non-differential input signals to generate positive and negative edge signals.

The squelch circuit 102 is operable to determine if a valid data signal is received by receiver 100. As determined by squelch circuit 102, if certain predetermined criteria for one or more valid data signals has been met, the three position switch 104 closes from a first position ("P1") to one of a second or a third position ("P2" or "P3", respectively). This enables the decoded received signals from decoder 101 to pass through receiver 100 and to be directed to some other device, such as, for example, a computer processing system or network. The predetermined criteria may include, without limitation, a minimum number of transitions in the input signal and the frequency of the input signal being above a minimum frequency and/or below a maximum frequency, or a combination of the foregoing. In one preferred embodiment, P1 represents an open circuit, and P2 and P3 represent data recovery states wherein the switch 104 closing to P2 or P3 would indicate reception of a data packet transmitted at a particular frequency, namely, at either 100 or 10 megabits/second, respectively, for example. It should be noted that any number of data packet transmission rates may be differentiated between in accordance with the principles of the present invention, and the utilization of the two rates as given above are for illustrative purposes only.

In alternate preferred embodiment, P1 again represents an open circuit and P2 a data recovery state, however, P3 represents a jam signal recognition state. A jam signal, for example, may be used to indicate that the receiver should be receiving a data packet, but for various and unspecified reasons, the packet has been corrupted, and is being replaced by a jam signal. The jam signal may be used to convey any suitable message or intelligence, as well as, used to control processing functions, such as by conveying suitable information to the receiver 100, such as the status of the network, for example. This is often necessary to insure proper network operation.

The transitions necessary for squelch circuit 102 to operate the three position switch must also meet the frequency restrictions given above. The above is achieved by triggering a counter, which will be discussed in detail with reference to FIGS. 2 and 3, within squelch circuit 102 when a first polarity transition in the input signal has occurred. This counter asserts an output signal, one for each particular state, a predetermined time after being triggered, each predetermined time is approximately one-half of one cycle in duration of a predetermined frequency. If a particular signal from the counter, corresponding to a predetermined frequency, is asserted when an opposite polarity transition occurs, then the frequency of the input signal is less than the predetermined frequency. If the signal is not asserted when the opposite polarity transition occurs, the frequency of the input signal is conversely greater than the predetermined frequency. If, for example, two or more alternating polarity transitions occur, meaning the desired frequency characteristics of one of the two exemplary states are received, then the received signal is probably one of the two or more valid data packets or a jam signal, as previously defined. The use of the word probably allows for the possibility of a noise burst looking like a valid signal.

The output of decoder 101 is passed through switch 104. If, at any time during reception of an otherwise valid data packet signal, transitions occur which do not satisfy the frequency requirements described above, such as during a collision of data packets as might occur in a communications system when two or more nodes are transmitting at once, the received data signals may be cleared. In an alternate embodiment, the received data signals may be cleared by another circuit at the end of data packet transmission.

Figure 2:
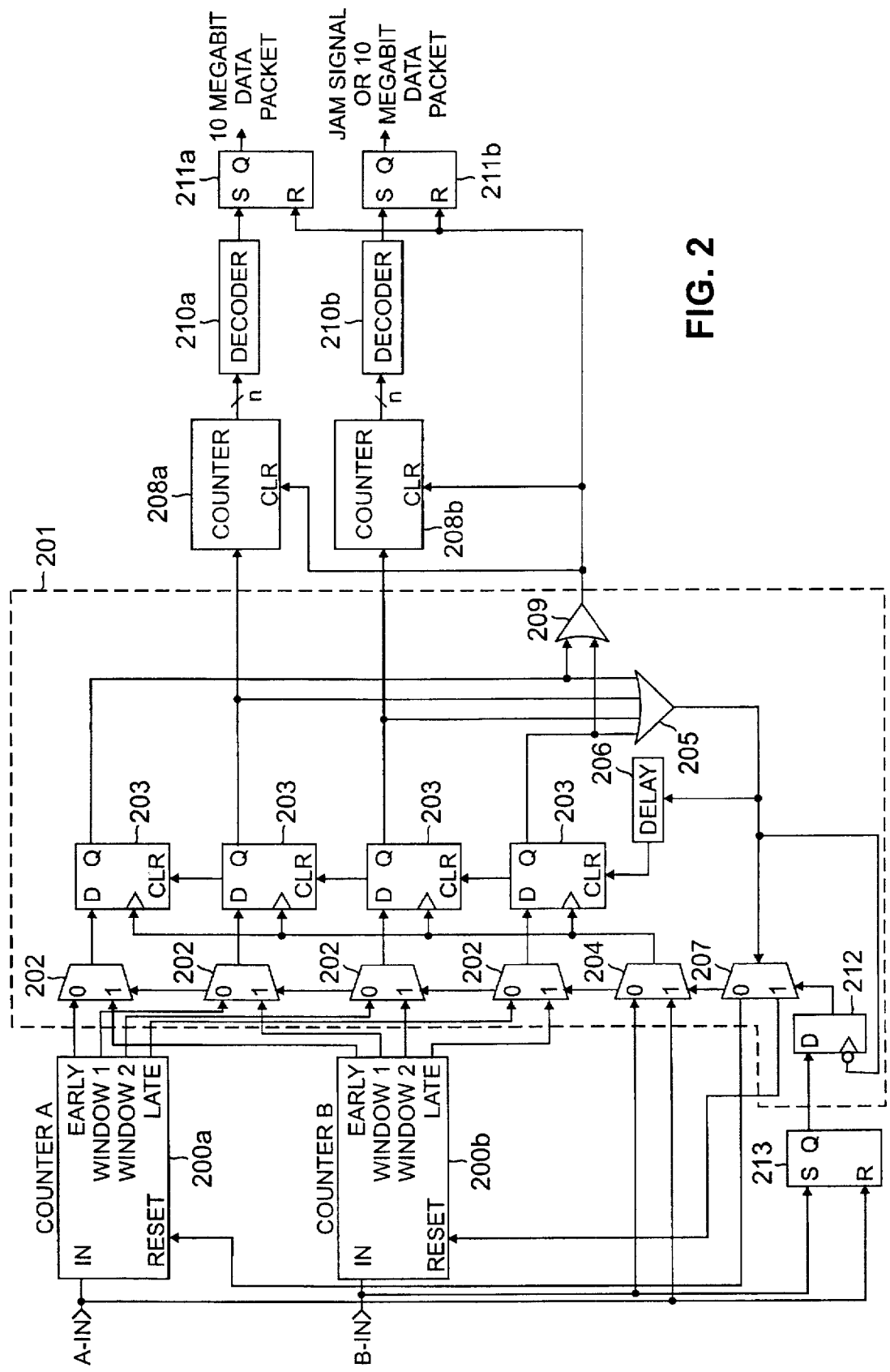
FIG. 2 illustrates one preferred embodiment of the squelch circuit shown in FIG. 1.

FIG. 2 illustrates one preferred embodiment of the squelch circuit 102 shown in FIG. 1. In accordance with the illustrated embodiment, the input signal is checked against both a minimum and maximum frequency limit. It also is checked for a minimum number of alternating transitions. Satisfying these criteria meets the aforementioned frequency restrictions for the acceptance of the input signal as valid. The illustrated embodiment includes two exemplary and substantially identical counters 200a and 200b. The counters 200a and 200b are triggered by a transition on the respective inputs A-IN and B-IN to squelch circuit 102. The counters 200a and 200b are triggered in response to opposite polarity transitions in the differential input signal to receiver 100.

The outputs EARLY, WINDOW1, WINDOW2 and LATE of the counters 200a and 200b relate to the significance of the next transition in the input signal (having an opposite polarity to the transition which triggered the enabled counter) when one of the outputs of counters 200a and 200b is asserted. If the next transition occurs, for example, when the EARLY signal is asserted, that transition occurred too soon, indicating the frequency of the input signal is too high. If the next transition occurs when the LATE signal is asserted, that transition occurred too late, indicating that the frequency of the input signal is too low. If, however, the next transition occurs when either the WINDOW1 or WIN- DOW2 signal is asserted, the frequency of the input signal is within one of the two desirable ranges.

It should be noted that the generation of the EARLY, WINDOW1, WINDOW2 and LATE timing signals maybe simultaneous or sequential. In the event that the timing signals are generated simultaneously, individual ones, indicating the timing intervals, of the signals end sequentially. Alternatively, if the timing signals are generated sequentially, the termination of one timing signal is preferably followed by the simultaneous, or near simultaneous, generation of a next timing signal.

Figure 3:
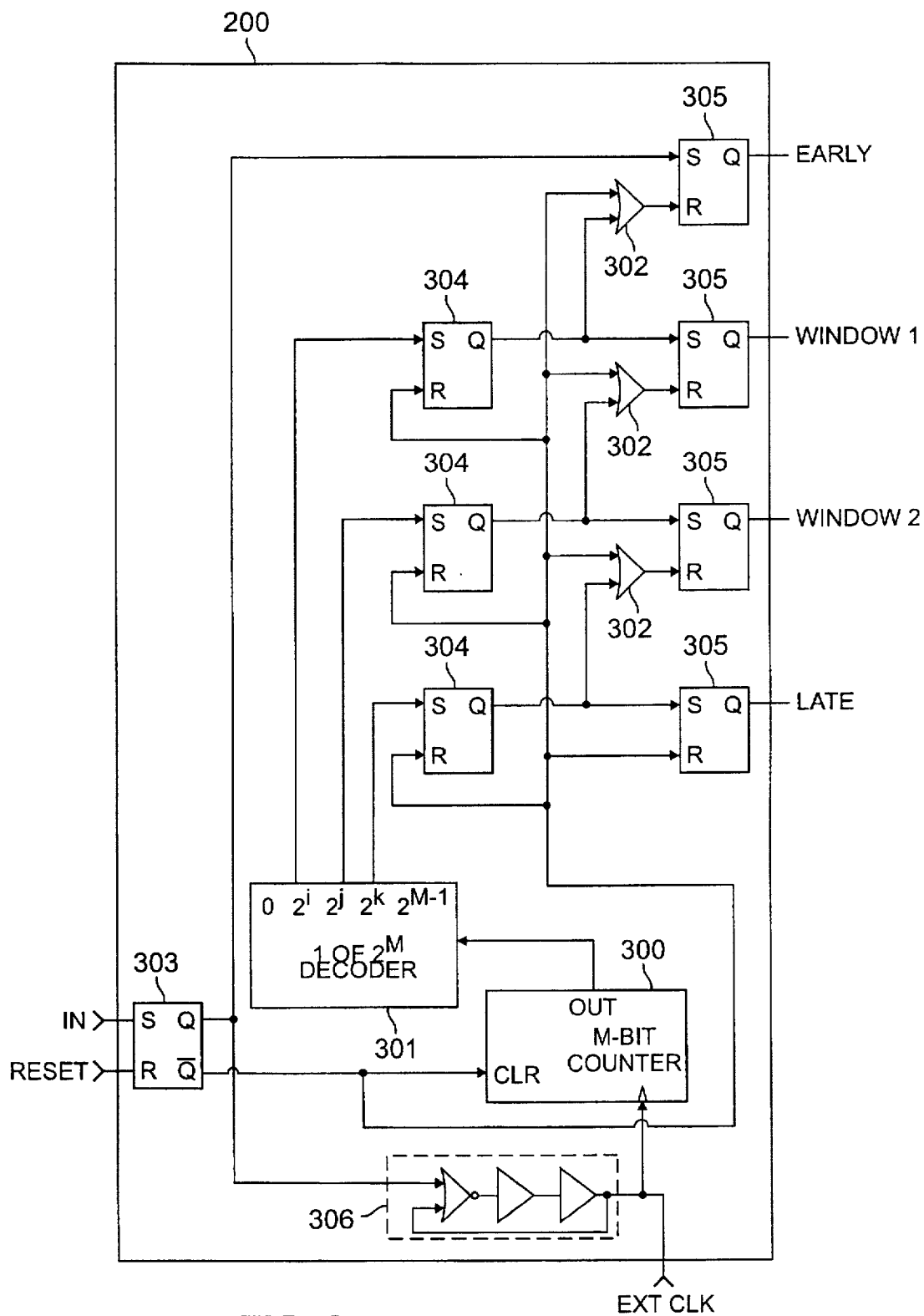
FIG. 3 illustrates one preferred embodiment of one of the two counters shown in FIG. 2.
Figure 4:
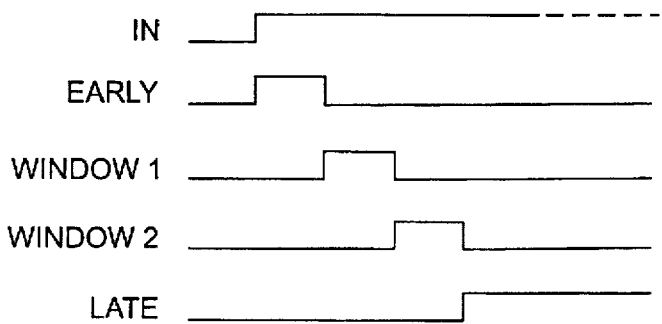
FIG. 4 illustrates the timing function of the counter shown in FIG. 3.

FIG. 3 illustrates one preferred embodiment of one of the counters 200a and 200b of FIG. 2 shown as counter 200. The timing function of the counter 200 is illustrated in FIG. 4. The counter 200 produces the four output signals, namely, EARLY, WINDOW1, WINDOW2, and LATE, as a function of the count of the M-bit counter 300. The output of the M-bit counter 300 drives a one-of-$2^M$ decoder 301. The EARLY signal is asserted after the M-bit counter 300 is triggered by an input signal to the input IN setting flip-flop 303. A first predetermined time later, determined by which output of decoder 301 is selected and the frequency of the clock to the M-bit counter 300, as will be discussed below, causes the WINDOW1 signal to be asserted and the EARLY signal to be cleared. A second predetermined time after the triggering of the M-bit counter 300, again as determined by which output of decoder 301 is selected and the frequency of the clock to the M-bit counter 300, the WINDOW2 signal is asserted and the WINDOW1 signal is cleared. At yet another predetermined time after the triggering of the M-bit counter 300, again as determined by which output of the decoder 301 is selected and the frequency of the clock to the M-bit counter 300, the LATE signal is asserted and the WINDOW2 signal is cleared. The outputs of decoder 301 are pulses that are latched by flip-flops 304. All the outputs, namely, EARLY, WINDOW1, WINDOW2 and LATE, are latched by flip-flops 305. A pulse to the RESET input of the M-bit counter 300 clears the asserted outputs of the M-bit counter 300 by clearing flip-flop 303 which clears flip-flops 304 and 305, and M-bit counter 300 to ready the M-bit counter 300 for a new input.

It should again be noted that the use of the WINDOW1 and WINDOW2 signals are for illustrative purposes only, and that the principles of the present invention may be extended to any number of "n" windows, i.e., WINDOWn, through the implementation of appropriate and suitably arranged logic. Note that the granularity of each window may be increased by increasing the clock frequency into counter 300 and adding appropriate and suitably arranged decoder logic.

The predetermined time intervals, as previously discussed, are determined by which outputs of the decoder 301 are selected and the frequency of the clock to the M-bit counter 300. The clock frequency may be derived from an external source, such as a master system clock (not shown) applied to the EXT CLK input, or from a gated ring oscillator 306, which preferably has a predetermined frequency of oscillation once enabled.

The predetermined time interval, during which the WINDOW1 signal is asserted, also as discussed, preferably corresponds to the highest frequency input signal squelch circuit 102 will accept. The other predetermined time interval, ending when the LATE signal is asserted, similarly corresponds to the lowest frequency input signal squelch circuit 102 will accept. Note that the corresponding predetermined time intervals for both counters 200a and 200b of FIG. 2 are preferably substantially the same.

Returning to FIG. 2, the outputs of the counters 200a and 200b are fed to a next edge detector 201 which controls the operation of the counters 200a and 200b depending on the polarity of the most recent transition in the input signal. The next edge detector 201 includes a plurality of multiplexers 202 which select which counter 200a or 200b output is to be used for measuring the time to the next/opposite polarity transition. When one of the counters 200a or 200b is triggered, for example counter 200a, the outputs of the counter are sampled by D-type flip-flops 203 when an opposite polarity transition occurs. Multiplexer 204 couples the appropriate opposite polarity transition pulse from the inputs A-IN or B-IN to the clock inputs of the flip-flops 203 (from the B-IN input to continue the above example) to control when the outputs of counter 200a are sampled by flip-flops 203.

The outputs of the flip-flops 203 are ORed together by OR gate 205, the output of which is delayed by a delay 206, and the flip-flops 203 are cleared. The delayed clearing of the flip-flops 203 generates a pulse at the output of OR gate 205 which clears the triggered counter, in this example counter 200a, through the de-multiplexer 207. Note that if the opposite polarity transition should occur during the interval of either the WINDOW1 or WINDOW2 signal from the triggered counter, here 200a is asserted, the associated N-bit counter 208a or 208b, respectively, is incremented, here N-bit counter 208a. If the transition occurs, however, when the EARLY or LATE signal is asserted, counters 208a and 208b are cleared by the ORing of the sampled signals from flip-flops 203 by OR gate 209.

Counters 208a and 208b count the minimum number of sequential opposite polarity transitions in the input signal that meet the frequency criteria associated with WINDOW1 or WINDOW2, respectively, as discussed above. When a predetermined number of valid transitions occur, determined by the selection of the appropriate output of one of the decoders 210a or 210b and latched by the associated flip-flop 211a or 211b, a respective valid output signal from squelch circuit 102 is asserted. The output signal may, for example, indicate the recognition of a 100 or a 10 megabit/second data packet or a jam signal.

The configuration of the multiplexers 202, 204 and demultiplexer 207, to select which counter 200a or 200b output is to be sampled and which input transition is to trigger the sampling, is controlled by D-type flip-flop 212. Flip-flop 212 samples the output of flip-flop 213 after the reset pulse from OR gate 205, through demultiplexer 207, clears the triggered counter 200a or 200b. Flip-flop 213 stores which polarity transition occurred last, from the signal on corresponding input A-IN or B-IN, such that when flip-flop 212 is clocked after the reset pulse, the multiplexers 202, 204 and demultiplexer 207 are reconfigured.

Figure 5:
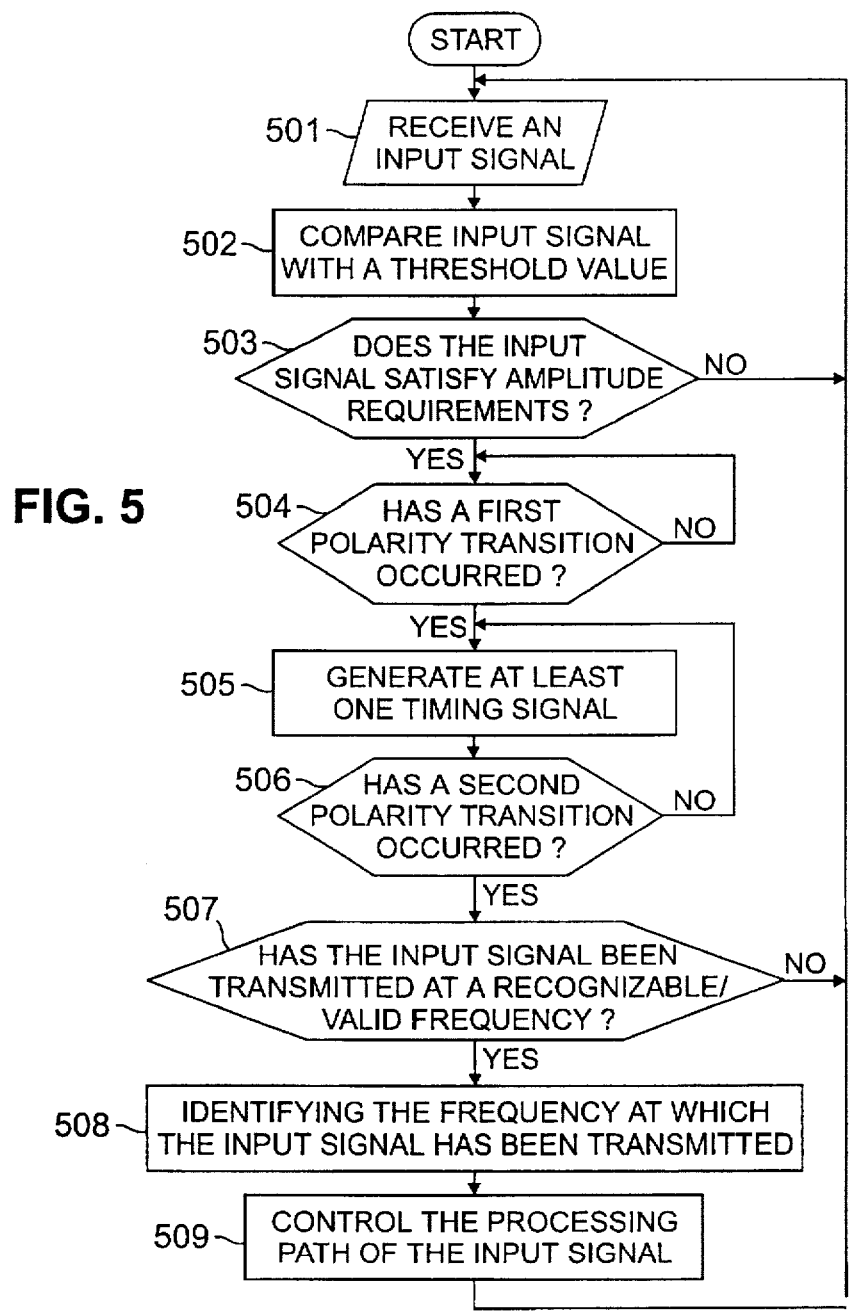
FIG. 5 illustrates an exemplary flow diagram representing one preferred method of operation of the illustrated embodiment shown in FIGS. 1, 2 and 3.

FIG. 5 illustrates an exemplary flow diagram representing one preferred method of operation of the illustrated embodiment shown in FIGS. 1–3. This flow diagram represents operation of the illustrated embodiment wherein an input signal, for example, a 100 or 10 megabit/second packet or a jam signal, has been received. Operation of the illustrated embodiment begins upon receipt of the differential input signal, input/output block 501. The input signal is preferably compared with a threshold value, such as, for example, Vth of slicers 103a and 103b in FIG. 1, processing block 502. If the comparison indicates that the input signal is not outside the limits set by the threshold value, NO branch of decisional block 503, then the input signal is invalid and the input receiving process preferably re-starts.

Recall, that the A-IN input to squelch circuit 102 of FIG. 1 goes high when the received differential input signal goes sufficiently positive (exceeding Vth, "HIGH"), and goes low when the received signal goes negative ("LOW"). Similarly, when the received differential input signal goes sufficiently low (below −Vth), the B-IN input signal to squelch circuit 102 goes high and goes low when the received signal goes high. The signals to A-IN and B-IN inputs accordingly represent the received input signal being high and low, respectively. Note that when the differential input signal is idle, both A-IN and B-IN are low.

If the input signal meets the limits of the threshold value, YES branch of decisional block 503, then the input signal is monitored to determine when a first polarity transition in the input signal occurs, decisional block 504. Upon the occurrence of the first polarity transition, YES branch of decisional block 504, at least one timing signal is generated, processing block 505. It should be noted, as previously discussed, that the generation of the timing signals may be simultaneous or sequential. In the event that the timing signals are generated simultaneously, individual ones of the signals end sequentially. Alternatively, if the timing signals are generated sequentially, the termination of one signal is preferably followed by the simultaneous, or near simultaneous, generation of a next timing signal.

The input signal is again monitored to determine when a second polarity transition in the input signal occurs, decisional block 506. For example, when the received input signal goes high, the counter 200a in FIG. 2 begins counting, asserting its output EARLY signal. After a predetermined interval of time, the WINDOW1 signal from the counter 200a is asserted, clearing the EARLY signal. If a high frequency data packet transmission, for example, 100 megabit/sec, is not received, then after another predetermined interval of time, the WINDOW2 signal from the counter 200a is asserted, and the WINDOW1 signal is cleared.

Upon the occurrence of the second polarity transition, YES branch of decisional block 506, a determination is made as to whether the input signal has been transmitted at a recognizable/valid frequency, such as at the exemplary transfer rates of 100 and 10 megabit/second, or at the frequency of the exemplary jam signal, such as, for example 4.0 MHz, decisional block 507.

For example, in accordance with the exemplary embodiment shown in FIG. 2, when the input signal goes negative, indicating that a lower frequency signal, such as that representative of a 10 megabit/second data packet or a jam signal, is being received, a reset pulse is applied to the counter 200a, clearing the WINDOW2 signal from counter 200a, while counter 200b begins counting. The counter 200b asserts its EARLY signal until a predetermined time later when the WINDOW1 signal is asserted, clearing the EARLY signal. After another predetermined interval of time, the WINDOW2 signal from the counter 200b is asserted, clearing the WINDOW1 signal. When a positive transition in the input signal occurs, the counter 200b is reset, and the counter 200a again begins counting. Note that the LATE signal from counter 200b is similarly not asserted.

If an unrecognizable/invalid data transfer rate is found, NO branch of decisional block 507, then the input signal is invalid and the process must re-start. Alternatively, the particular frequency at which the input signal has been transmitted is identified, processing block 508.

Since at least two reset pulses to counters 200a and 200b were in response to "valid" input transitions, and all met the frequency limitations by occurring when a WINDOW2 signal was asserted, the lower frequency 10 megabit/second data packet or jam signal has been received. This results from the counters 208a or 208b of FIG. 2 being incremented two times, and with the appropriate output of the decoder 210 selected, one of the two associated flip-flops 211a or 211b is set. After "n" valid transitions, the next transition "n+1" occurs when the LATE signal is asserted from counter 200b, causing the counter 208b to be cleared along with the flip-flop 211b. Note that the first reset pulse to counter 200b is not "valid" since the first transition in the input signal ended the idle state, during which the LATE signal from counter 200b was asserted.

The identified transmission frequency is utilized to selectively control the transmission path of the input signal, such as through the receiver 100 in FIG. 1, processing block 509. It should be noted that the select signal to the multiplexers 202, 204 and demultiplexer 207 in FIG. 2 changes state with the falling edge of the reset pulses. The resultant delay in changing state assures that the pulses generated by the clearing of the flip-flops 203 using OR gate 205 and delay 206 are finished before the multiplexers 202, 204 and demultiplexer 207 are reconfigured.

Although the present invention and its advantages have been described in detail, it should be understood that various changes, substitutions and alterations can be made herein without departing from the spirit and scope of the invention.

We claim:

1. A digital data receiver for differentiating between a plurality of input signals transmitted at a plurality of frequencies, said digital data receiver comprising:
    means for receiving an input signal transmitted at a first frequency which is one of said plurality of frequencies;
    means for generating a plurality of timing signals wherein each one of said timing signals is generated at a particular predetermined time after a first polarity transition in said input signal;
    means for determining if a second polarity transition in said input signal occurs during a particular time interval between ones of said timing signals; and
    means for indicating at which one of said plurality of frequencies said input signal is transmitted.

2. The receiver as set forth in claim 1 wherein said receiving means further includes slicing means for selectively processing said input signal.

3. The receiver as set forth in claim 1 wherein said indicating means operates to control selectively switching means for directing said input signal through said receiver.

4. The receiver as set forth in claim 1 wherein said generating means includes a plurality of counters.

5. The receiver as set forth in claim 4 wherein each of said plurality of counters selectively operates to produce at least one timing signal indicative of an invalid transmission frequency.

6. The receiver as set forth in claim 4 wherein each one of said counters is responsive to a clock.

7. The receiver as set forth in claim 1 further comprising means for selectively directing said input signal through said receiver, said means for selectively directing being operable when said input signal includes a plurality of alternating polarity transitions wherein the frequency of the transitions after said first polarity transition correspond to a particular valid time interval between ones of said timing signals.

8. A method for controlling the processing path of an input signal received at one of a plurality of frequencies, said method comprising the steps of:
    generating a plurality of timing signals wherein each one of said timing signals is generated at a particular predetermined time after a first polarity transition in said input signal;

determining if a second polarity transition in said input signal occurs during a particular time interval between ones of said timing signals, said particular time interval corresponding to one of said plurality of frequencies; and indicating at which frequency of said plurality of frequencies said input signal is received.

9. The method as set forth in claim 8 wherein said generating step is preceded by the step of comparing said input signal with a threshold value.

10. The method as set forth in claim 9 further including the step of selectively processing said input signal in response to said comparison step.

11. The method as set forth in claim 8 further including the step of selectively controlling the processing path of said input signal in response to said indicating step to properly process signals of different protocols.

12. The method as set forth in claim 8 wherein said generating step includes the step of producing at least one other timing signal indicative of an invalid transmission frequency.

13. The method as set forth in claim 8 wherein said input signal includes a plurality of alternating polarity transitions and said determining step includes the step of selectively controlling the processing path of said input signal in response to the frequency of said plurality of alternating transitions.

14. A circuit for selectively directing a received input signal, said input signal having a transmission frequency equal to one of a plurality of frequencies, said circuit comprising:

means for generating a plurality of timing signals wherein each one of said timing signals is generated at a particular predetermined time after a first polarity transition in said input signal;

means for determining if a second polarity transition in said input signal occurs during a particular time interval between ones of said timing signals; and means for indicating at which one of said plurality of frequencies said input signal is received.

15. The circuit as set forth in claim 14 further comprising means for comparing said received input signal with a threshold value.

16. The circuit as set forth in claim 15 further includes means, responsive to said comparing means, for processing said input signal.

17. The circuit as set forth in claim 14 further including switching means, responsive to said indicating means, for directing said input signal through said circuit.

18. The circuit as set forth in claim 14 further including means for producing a first timing signal indicative of an invalid transmission frequency.

19. The circuit as set forth in claim 14 wherein said generating means includes a plurality of counters.

20. The circuit as set forth in claim 19 wherein each one of said counters is responsive to a clock.

21. The circuit as set forth in claim 14 wherein said determining means includes a plurality of flip-flops.

22. The circuit as set forth in claim 14 wherein said input signal includes a plurality of alternating polarity transitions and said determining means includes means for directing said input signal in response to the frequency of the alternating polarity transitions.

* * * * *